Sept. 18, 1956 G. F. SCHECKLER 2,763,305
ASPARAGUS SIZER HAVING FLUID POSITIONING MEANS
Filed Feb. 26, 1954 2 Sheets-Sheet 1

INVENTOR
Gordon F. Scheckler
BY
ATTORNEYS

Sept. 18, 1956  G. F. SCHECKLER  2,763,305
ASPARAGUS SIZER HAVING FLUID POSITIONING MEANS
Filed Feb. 26, 2 Sheets-Sheet 2

INVENTOR.
Gordon F. Scheckler
BY
ATTORNEYS.

United States Patent Office 2,763,305
Patented Sept. 18, 1956

2,763,305

ASPARAGUS SIZER HAVING FLUID POSITIONING MEANS

Gordon F. Scheckler, San Joaquin, Calif.

Application February 26, 1954, Serial No. 412,813

1 Claim. (Cl. 146—81)

This invention relates to asparagus trimming machines such as are used to trim asparagus stalks to a certain predetermined length after the asparagus has been cut in the field and before it is crated or otherwise packed for delivery to a cannery for processing.

Such machines include a horizontal conveyor on which the asparagus is stacked transversely, a back stop against which the tips of the stalks are presumably abutted, and a circular saw mounted to trim off the butt ends of the stalks as they move along on the conveyor so that all the stalks will be cut to the same length as is desirable for marketing purposes.

Prior to my invention, it was the practice, after the asparagus has been stacked on the conveyor, to shove the asparagus laterally and toward the back stop by hand pressure.

Due to various factors, including the fact that the stalks, as stacked, are apt to be of uneven length, such hand pressure (exerted as it is over a given area of the stack at one time) is not effective to move all the stalks thus pressed into contact with the back stop. As a result, the saw does not trim all the stalks to the same length.

The principal object of the present invention is to incorporate, in an apparatus of the above described general type, a means to cause the stalks of asparagus stacked on the conveyor to be positively abutted at their tip and against the back stop before the asparagus is trimmed by the saw so that the actual length of all the trimmed stalks will be the same.

Still another object of the invention is to provide a vegetable sizer which is practical, reliable, and durable, and one which is exceedingly effective for the purpose for which it is designed.

These objects are accomplished by means of such structure and relative arrangement of parts as will fully appear by a perusal of the following specification and claim.

Figure 1:
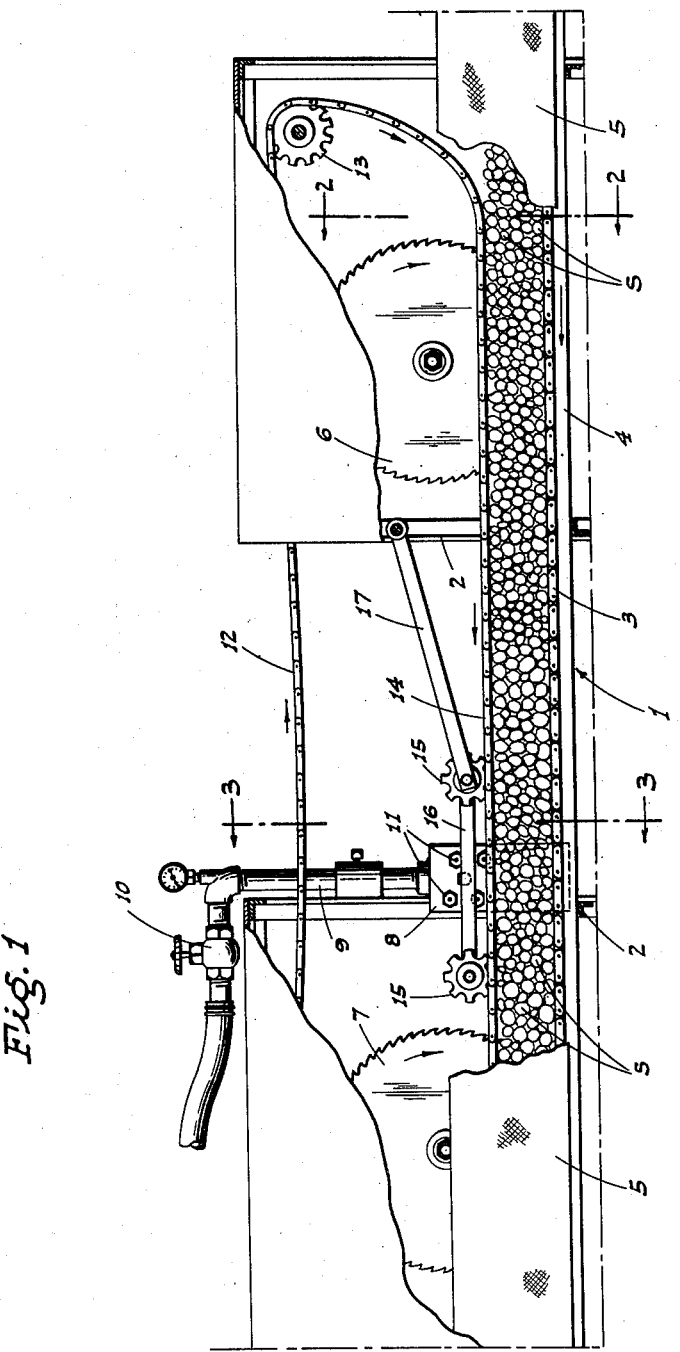
Fig. 1 is a fragmentary side elevation, partly broken away, of the improved asparagus trimming apparatus.

Referring now more particularly to the characters of reference on the drawings, the apparatus comprises an elongated asparagus-supporting horizontal platform, indicated generally at 1, mounted on a suitable framework 2 so that the platform is at a convenient height for asparagus to be placed on the platform by operators standing on the floor.

The platform 1 comprises a driven link-chain conveyor 3 of conventional form, resting on longitudinal bars 4 set on edge and supported in a fixed position from the frame 2.

Mounted in connection with the conveyor and extending lengthwise thereof and above the same on one side is one run of a wide belt 5 disposed on edge and driven in the same direction as conveyor 3 and forming a back stop for engagement by the tips of the asparagus stalks S being trimmed.

The provision of such a conveyor and driven back stop is a common feature of asparagus trimming apparatus, and hence no showing of the specific driving and mounting mechanisms for the conveyor and back stop belt are deemed necessary.

Figure 2:
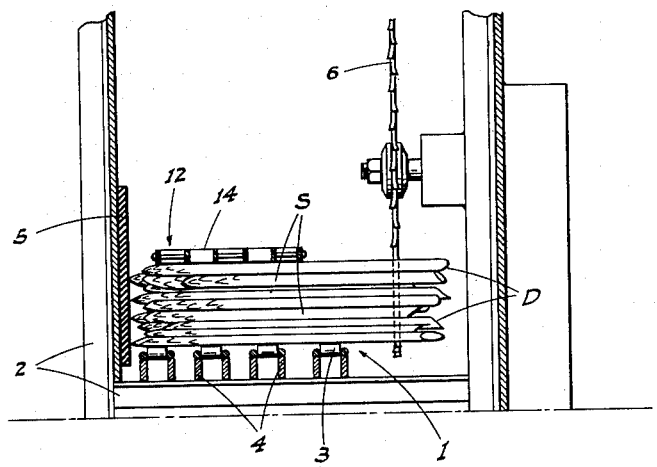
Fig. 2 is an enlarged fragmentary cross section on line 2—2 of Fig. 1.
Figure 3:
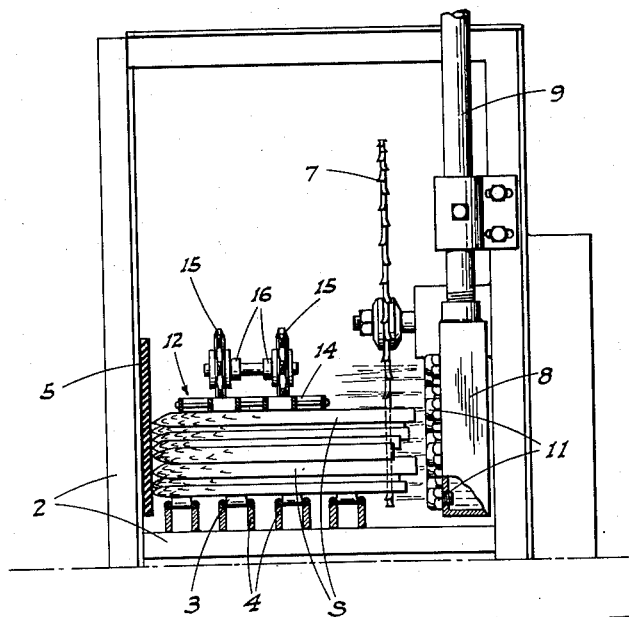
Fig. 3 is an enlarged cross-section on line 3—3 of Fig. 1.

Mounted in connection with the conveyor, or intermediate its ends and disposed on the side thereof opposite the belt 5, is a driven circular saw 6. The saw is arranged with its axis horizontal and transversely of the conveyor and extends upwardly from below the conveyor; the diameter of the saw being such that the center of the saw is at a level not below the level of the top edge of the belt 5. The spacing of the saw from the belt is somewhat less than the length of the longest stalks S of asparagus which may be placed on the conveyor ahead of the saw for trimming, as shown in Fig. 2.

Also mounted in connection with the conveyor beyond saw 6 is another similarly disposed saw 7. This saw, however, is spaced from the belt 5 a predetermined distance less than the length of the stalks 7 after they have been trimmed by the saw 6.

When the stalks are thus finally trimmed, they are assumed to be all the same length; such length having been predetermined as that desired for final boxing or packing of the asparagus.

This desired length will not be obtained, however, unless the tips of the stalks are in contact with the back stop, an operation which heretofore has been performed by hand with uncertain results, as set forth in the preamble.

To assure the stalks, after their initial trimming, being positively shifted laterally if necessary so that the tips all contact the back stop, the following arrangement is provided:

Disposed on the same side of the conveyor as the saws 6 and 7 and in an intermediate position therebetween is an upstanding manifold 8; water under pressure being supplied to the manifold by a pipe 9 having a control valve 10 therein. Secured in the manifold and facing the back stop is a battery of vertically and horizontally spaced jet nozzles 11 arranged to direct high-pressure jets of water against the butts of the stalks S so as to shift the same laterally of the conveyor and against the back stop for the reason previously pointed out.

In connection with such water-pressure shifting of the stalks laterally on the conveyor, the initial trimming saw has a valuable function. The butt ends of the stalks, as cut in the field, are usually diagonal, as shown at D in Fig. 2. If such diagonal butt ends were exposed to the jets, the water pressure would tend to deflect the stalks up, down, or laterally rather than directly lengthwise, as is necessary.

With square-cut ends, however, as given to the stalks by the initial trimming saw 6, the water pressure is directed against the stalk ends at right angles to the surface thereof, and a positive lengthwise shifting of the stalks in the direction of the back stop, until they abut the same, is assured. The length of all stalks, after being finally trimmed by the saw 7, is, therefore, the same.

In operation, the asparagus stalks are stacked on the conveyor transversely thereof and ahead of the saw by an operator from the supply as brought in from the field. As stacked, the asparagus is shoved by hand in the direction of the back stop so as to generally abut the tips of the stack of untrimmed stalks against the back stop.

The depth of the asparagus, as stacked, is, of course, controlled by the operator so that such depth is never greater than the height of the back stop. With the movement of the stack along the conveyor, the stack is first subjected to the trimming action of the saw 6, then to the lateral shifting and back-stop engaging action of the pressure jets, and then to the final trimming action of the saw 7.

In order to maintain the asparagus stalks in their proper transversely disposed position on the conveyor as they are cut by the saws, a hold-down device is provided.

This device is in the form of an endless slack chain 12 whose upper run is supported on sprockets, one of which is shown at 13, and whose lower run 14 rests of its own weight on the stack from a point ahead of saw 6 to a point beyond the saw 7, as shown in Fig. 1.

In order to increase the downward pressure of the lower run 14 of the chain 12 on the stack, said lower run may be engaged intermediate its ends by idler sprockets 15 mounted on connecting arms 16, which arms, in turn, are connected to tension arms 17 pivoted on the framework 2.

By this means, the hold-down chain may yield up or down without restraint, as well as move lengthwise with the asparagus as the latter advances, and as the varying height of the stack passing under the chain may determine.

The water jets not only act on the stalks for the purpose above set forth, but also wash the stalks to a certain extent; such washing being preferably further performed by suitable means (not shown) in the apparatus after the stalks have been finally trimmed and have passed from under the hold-down chain 12.

While the machine is heretofore described as used in connection with field-cut asparagus, the machine is equally well adapted for use in canneries to accomplish the final trimming or cutting to length preparatory to canning the asparagus.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

An asparagus trimming apparatus comprising a horizontal conveyor on which the asparagus stalks to be trimmed are disposed so as to extend laterally of the conveyor, a back stop along one side of and above the conveyor arranged for engagement by the tips of the stalks on the conveyor, a saw disposed on the side of the conveyor opposite the back stop in position to trim off the butt ends of the stalks as they are conveyed past the saw, a battery of jet nozzles mounted at the same side of the conveyor as said saw and above the conveyor, means to feed water under pressure to the nozzles, the latter being disposed to direct the water laterally of the conveyor in the direction of the back stop, and an additional butt-stalk trimming member disposed on said opposite side of the conveyor ahead of the nozzles to initially trim the butt ends of the stalks so as to present square ends to the jets from the nozzles.

References Cited in the file of this patent

UNITED STATES PATENTS

| | | |
|---|---|---|
| 1,193,935 | Smith et al. | Aug. 8, 1916 |
| 1,246,935 | Killingsworth | Nov. 20, 1917 |
| 1,950,729 | Johnson | Mar. 13, 1934 |
| 2,310,358 | Emmons et al. | Feb. 9, 1943 |